US008094367B2

(12) United States Patent
Ham

(10) Patent No.: US 8,094,367 B2
(45) Date of Patent: Jan. 10, 2012

(54) OPTICALLY LOCKED PHOTON ECHO APPARATUS AND METHOD

(75) Inventor: Byoung Seung Ham, Incheon (KR)

(73) Assignee: INHA-Industry Partnership Institute (KR)

(*) Notice: Subject to any disclaimer, the term of this patent is extended or adjusted under 35 U.S.C. 154(b) by 0 days.

(21) Appl. No.: 12/857,537

(22) Filed: Aug. 16, 2010

(65) Prior Publication Data
US 2011/0222387 A1 Sep. 15, 2011

(30) Foreign Application Priority Data
Mar. 12, 2010 (KR) .................. 10-2010-0022444

(51) Int. Cl.
G02F 1/35 (2006.01)
(52) U.S. Cl. ........ 359/326; 359/327; 359/330; 265/106; 372/21
(58) Field of Classification Search .............. 365/106, 365/215; 359/326, 327, 330; 372/21
See application file for complete search history.

(56) References Cited

PUBLICATIONS

C. Liu et al, "Observation of Coherent Optical Information Storage in an Atomic Medium Using Halted Light Pulses," Nature vol. 409, pp. 490-493 (2001).
Hetet et al., "Electro-Optic Quantum Memory For Light Using Two-Level Atoms," Phys. Rev. Lett, vol. 100, p. 023601 (2008).
B. Hosseini et al., "Coherent Optical Pulse Sequencer For Quantum Applications" Nature vol. 461, pp. 241-245 (2009).
H. de Riedmatten et al.; "A Solid-State Light-Matter Interface at the Single-Photon Level," Nature 456, 773 (2008).
Afzelius, M., et al.; "Multimode Quantum Memory Based on Atomic Frequency Combs", Phys. Rev. A 79, 052329 (2009).
B. S. Ham; "Control of Photon Storage Time Using Phase Locking," Opt. Exp. 18, 1704 (2010).
B. S. Ham;"Ultralong Quantum Optical Storage Using Reversible Inhomogeneous Spin Ensembles," Nature Photon. vol. 3, pp. 518-522 (2009).
M. Nilsson et al; "Solid State Quantum Memory Using Complete Absorption and Re-Emission of Photons by Tailored and Externally Controlled Inhomogeneous Absorption Profiles," Opt. Commun. 247, 393 (2005).
S. A. Moissev et al; "Complete Reconstruction of the Quantum State of a Single-Photon Wave Packet Absorbed by a Doppler-Broadened Transition," Phys. Rev. Lett. 87, 173601 (2001).
M. Afzelius et al., "Demonstration of Atomic Frequency Comb Memory for Light With Spin-Wave Storage," Phys. Rev. Lett. 104, 040503 (2010).
S. Ham et al.; "Spin Coherence Excitation and Rephasing With Optically Shelved Atoms," Phys. Rev. B 58, R11825 (1998).
N. A. Kurnit, et al.; "Observation of a Photon Echo," Phys. Rev. Lett. vol. 13, pp. 567-570 (1964).
T. W. Mossberg; "Time-Domain Frequency-Selective Optical Data Storage," Opt. Lett. vol. 7, pp. 77-79 (1982).
S. A. Moiseev et al; "Quantum memory photon echo-like techniques in solids," J. Opt. B: Quantum Semiclassical Opt. 5, S497 (2003).

(Continued)

Primary Examiner — Wayne Young
Assistant Examiner — Brenda Bernardi
(74) Attorney, Agent, or Firm — Hershkovitz & Associates, LLC; Abraham Hershkovitz

(57) ABSTRACT

Disclosed herein is an optically locked photon echo apparatus and method, which can solve the problem of limited echo efficiency and can overcome constraints on the conventional storage time being limited to the spin dephasing time. The optically locked photon echo apparatus of the present invention includes a nonlinear optical medium and an optical pulse generation unit. The nonlinear optical medium is provided with three energy levels $|1\rangle$, $|2\rangle$, and $|3\rangle$, and is configured to receive optical pulses from an optical pulse generation unit and generate output light (E) which satisfies a phase matching condition. The optical pulse generation unit is configured to generate five or more optical pulses which resonate between the energy levels of the optical medium.

18 Claims, 14 Drawing Sheets

PUBLICATIONS

J. J. Longdell et al., "Stopped light with storage times greater than one second using electromagnetically induced transparency in a solid," Phys. Rev. Lett. 95, 063601 (2005).

B. S. Ham et al.; "Frequency-Selective Time-Domain Optical Data Storage by Electromagnetically Induced Transparency in a Rare-Earth-Doped Solid", Opt. Lett. vol. 22, pp. 1849 (1997).

OPTICALLY LOCKED PHOTON ECHO APPARATUS AND METHOD

CROSS-REFERENCE TO RELATED APPLICATIONS

The present application claims priority under 35 U.S.C. 119 of Korean Patent Application No. 10-2010-0022444, filed on Mar. 12, 2010, the disclosure of which is expressly incorporated by reference herein in its entirety.

BACKGROUND OF THE INVENTION

1. Field of the Invention

The present invention relates, in general, to a photon echo apparatus and method, and, more particularly, to an optically locked photon echo apparatus and method, which includes a nonlinear optical medium having three energy levels and an optical pulse generation unit for generating five or more optical pulses resonating between the energy levels of the nonlinear optical medium.

2. Description of the Related Art

The storage of quantum optical data is necessary for quantum information processing ranging from quantum computers that require a shorter storage time to quantum communications such as long distance quantum cryptography that requires a longer storage time.

Similarly to all classical optical memory devices, the performance of quantum memory is also determined by writing speed, bandwidth, and storage time. Even though slow light-based quantum memory which uses stopped light has succeeded in proving the storage of quantum optical data, actual limitations such as limited storage time and the inevitable use of only one piece of quantum optical data have become obstacles to quantum communications [C. Liu, Nature Vol. 409, pp. 490-493 (2001)].

On the other hand, research into photon echoes has been intensively conducted in order to apply the photon echoes to quantum memory owing to their characteristics such as high speed access rate, ultrawide bandwidth, and extremely longer storage time [G. Hetet, Phys. Rev. Lett. Vol. 100, p. 023601 (2008), and B. Hosseini, Nature Vol. 461, pp. 241-245 (2009)].

Recently, photon echoes have succeeded in experimentally demonstrating the storage of quantum optical data using a rare-earth-doped solid medium [H. de Riedmatten, Nature Vol. 456, pp. 773-777 (2008)].

To be used in quantum memory, two-pulse photon echoes must have more than 50% echo efficiency. However, in the two-pulse photon echoes, the storage time is limited by the optical phase relaxation time and is about 100 μs in a rare earth-doped optical medium.

The storage time of three-pulse photon echoes is limited by the optical population decay time and is similar to the optical phase relaxation time. Unlike the two-pulse photon echoes, three pulse photon echoes cannot retrieve more than 50% of stored information due to optical coherence loss attributable to optical population decay.

Recently, several modifications, which are intended to extend the storage time as well as to improve retrieval efficiency, have been proposed to make up for the problems with photon echoes that have occurred to date. With regard to the storage time, there is only one modification which has succeeded, that is, an Atomic Frequency Comb (AFC) method [Afzelius, M., Phys. Rev. A 79, 052329 (2009)]. AFC, however, is problematic in that a long preparation time is required because to replace two π/2-π/2 optical pulse sequences in the three-pulse photon echo system, hundreds of optical pulse trains, each composed of two weak optical pulse pair, are used to make a sharp spectral grating.

In phase-locked echo methods, the storage time is extended from optical phase relaxation time to spin dephasing time, which is inversely proportional to spin inhomogeneous broadening [B. S. Ham, Opt. Exp. Vol. 18, No. 2, pp. 1704-1713 (2010)].

Further, in the case of phase-locked photon echoes or resonant Raman echoes, optical coherence loss occurs during the storage time [B. S. Ham, Nature Photon. Vol. 3, pp. 518-522 (2009)].

Furthermore, in modified two-pulse photon echo methods using Controlled Reversible Inhomogeneous Broadening (CRIB), phase inversion is realized using an externally applied Direct Current (DC) voltage or a magnetic field gradient, where spontaneous emission noise caused by a rephasing pulse in conventional two-pulse photon echoes is eliminated. However, the storage time in CRIB is still limited by the optical phase relaxation time, which is much shorter than a millisecond [M. Nilsson and S. Kroll, Opt. Commun. Vol. 247 (No. 4-6), pp. 393-403 (2005)].

SUMMARY OF THE INVENTION

Accordingly, the present invention has been made keeping in mind the above problems occurring in the prior art, and an object of the present invention is to provide an optically locked photon echo apparatus and method, which can solve the problem of limited echo efficiency and can overcome constraints on the conventional storage time being limited to the spin dephasing time.

Another object of the present invention is to provide an optically locked photon echo apparatus and method, which extend the storage time up to spin population relaxation time while obtaining more than 50% retrieval efficiency because the present invention locks even the phase evolution of individual atoms as well as an optical population decay process, unlike the conventional version of phase-locked photon echoes. A further explanation thereof may be given in such a way that, in rare-earth-doped crystal such as $Pr^{3+}$-doped $Y_2SiO_5$, the spin population relaxation time is at least a million times as long as the spin dephasing time which is the limit of the storage time of conventional three-pulse photon echoes.

A further object of the present invention is to provide an optically locked photon echo apparatus and method, which causes the storage time to be unchanged even by spin dephasing caused by spin inhomogeneous broadening. Thanking to the inherent optical phase locking characteristics of three-pulse photon echoes, preventing optical coherence loss from population decay the optically locked echo provides ultralong photon storage time with more than 50% retrieval efficiency.

In order to accomplish the above objects, the present invention provides an optically locked photon echo apparatus, comprising a nonlinear optical medium provided with three energy levels $|1>$, $|2>$, and $|3>$, and configured to receive optical pulses from an optical pulse generation unit and generate output light (E) which satisfies a phase matching condition; and the optical pulse generation unit configured to generate five or more optical pulses which resonate between the energy levels of the optical medium.

Preferably, the optical pulse generation unit comprises a first light source for providing first laser light; a second light source for providing second laser light; a first optical modulation module for modulating the first laser light from the first light source into an optical pulse train so as to generate some of the five or more optical pulses; a second optical modulation module for modulating the second laser light from the second light source into an optical pulse train so as to generate remaining optical pulses, which are different from the optical pulses generated by the first optical modulation module among the five or more optical pulses; and a control module for generating a synchronous signal required to synchronize the optical pulses output from the first and second optical modulation modules with each other.

Preferably, the five or more optical pulses fall into a first optical pulse group including one or more of optical pulses corresponding to input light (D), write light (W) and read light (R) which resonate between the energy levels |1> and |3> of the optical medium; and a second optical pulse group including optical pulses corresponding to first control light (B1) and second control light (B2) which resonate between the energy levels |2> and |3> of the optical medium.

Preferably, the first optical pulse group and the second optical pulse group have different wavelengths or polarization.

Preferably, the five or more optical pulses are incident on the optical medium after having passed through an optical fiber, surface plasmon polariton, or free space.

Preferably, the three energy levels are set in such a way that the energy levels |1> and |2> form ground states, and the energy level |3> is an excited state which enables optical transition from the individual ground states.

Preferably, a time interval between the input light (D) and the write light (W) is shorter than an optical phase relaxation time, but has a length sufficient to fall within the spectral width of the system.

Preferably, a time interval between the first control light (B1) and the second control light (B2) is shorter than a spin population relaxation time.

Preferably, wherein areas of the pulses corresponding to the first control light (B1) and the second control light (B2) are $\pi$ and $3\pi$, respectively, and a sum of the areas of these pulses is $4\pi$.

Preferably, the nonlinear optical medium is a solid, multiply coupled semiconductors, or a cold atom ensemble.

In addition, the present invention provides an optically locked photon echo method for generating output light (E), which satisfies a phase matching condition, using an optically locked photon echo apparatus, the apparatus including a nonlinear optical medium provided with three energy levels |1>, |2> and |3> and configured to receive optical pulses from an optical pulse generation unit and generate the output light (E); and the optical pulse generation unit configured to generate optical pulses corresponding to one or more input lights (D), write light (W), read light (R), first control light (B1) and second control light (B2) which resonate between the energy levels of the optical medium, the method comprising the input light (D) being incident on the optical medium; the write light (W) being incident on the optical medium; the input light (D) and the write light (W), which are temporally spaced apart from each other, forming a spectral grating in cooperation with each other; the first control light (B1) being incident on the optical medium; the second control light (B2) being incident on the optical medium; the read light (R) being incident on the optical medium; reproducing information of the input light (D), stored in the spectral grating, using the read light (R); and the input light (D), the write light (W) and the read light (R) generating the output light (E), which satisfies the phase matching condition, via interaction with the optical medium.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of an optically locked photon echo apparatus and method according to the present invention will be described in detail with reference to the attached drawings.

It is apparent that the following embodiments of the present invention are only intended to embody the present invention, and are not intended to restrict or limit the scope of the present invention. Contents that can be easily derived by those skilled in the art from the detailed description and embodiments of the present invention are interpreted as falling within the scope of the present invention.

Figure 1A:
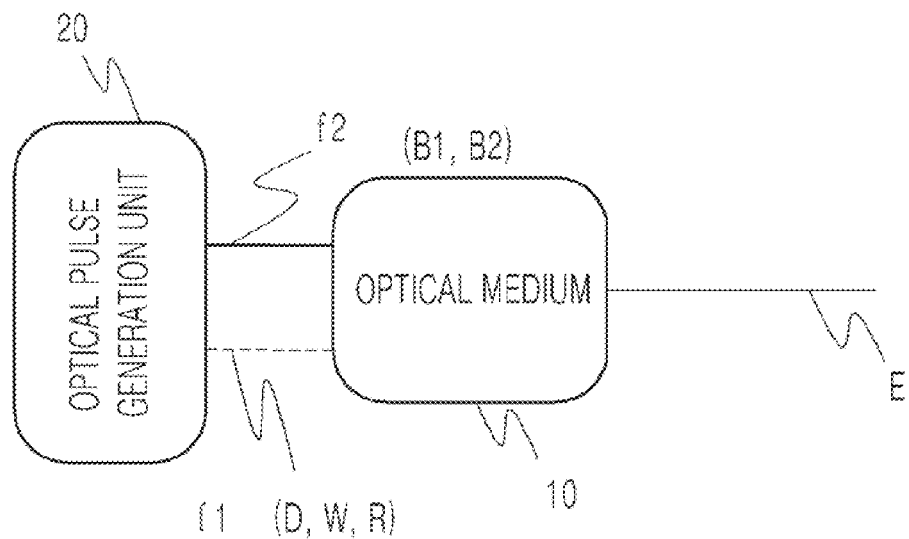
FIGS. 1A and 1B are respectively a configuration diagram of an optically locked photon echo apparatus and a diagram of the energy levels of an optical medium interacting with optical pulses according to an embodiment of the present invention.
Figure 1B:
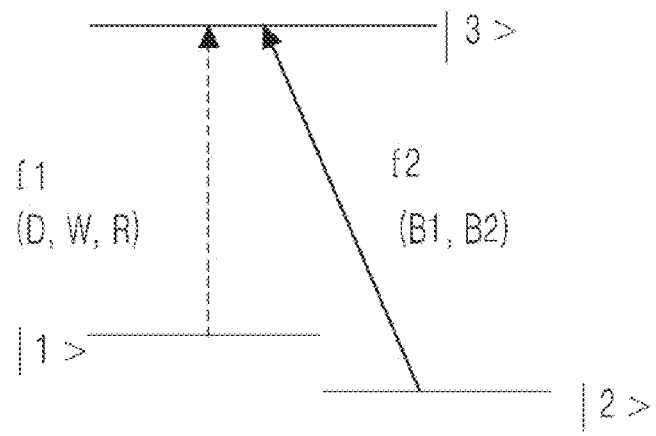

FIGS. 1A and 1B are respectively a configuration diagram of an optically locked photon echo apparatus and a diagram of the energy levels of an optical medium interacting with optical pulses according to an embodiment of the present invention.

As shown in FIG. 1A, the optically locked photon echo apparatus according to an embodiment of the present invention includes an optical medium 10, and an optical pulse generation unit 20 for generating five or more optical pulses resonating between the energy levels of the optical medium 10.

The optical medium 10 has nonlinear optical characteristics and has three energy levels |1>, |2> and |3>.

Here the optical medium 10 can be a solid such as a rare-earth $Pr^{3+}$ doped $Y_2SiO_5$, multiply coupled semiconductors, or a cold atomic ensemble.

FIG. 1B illustrates the energy levels of the optical medium 10 which interacts with the five or more optical pulses.

Among the three energy levels, the energy levels |1> and |2> are in a ground state, and the energy level |1> is slightly higher or lower than the energy level |2>. Further, |3> is in an excited state and enables optical transition from the individual ground states to the excited state.

FIGS. 1A and 1B will be described in detail below.

The five or more optical pulses fall into a first optical pulse group f1 including optical pulses corresponding to one or more input lights D, write light W and read light R which resonate between the energy levels |1> and |3> of the optical medium 10; and a second optical pulse group f2 including optical pulses corresponding to first control light B1 and second control light B2 which resonate between the energy levels |2> and |3> of the optical medium 10. The five or more optical pulses are incident on the optical medium 10 after having passed through an optical fiber, surface plasmon medium or free space.

That is, the first optical pulse group f1 and the second optical pulse group f2 are implemented using light having different wavelengths or polarization. The first optical pulse group f1 is used for the input light D, the write light W, and the read light R. The second optical pulse group f2 has the first control light B1 used to transfer excited atoms in state |3> into the ground state |2>, and the second control light B2 used to transfer the transferred atoms in state |2> back to the excited state |3>.

Further, the input light D may include one or more lights, and the time interval between the first control light B1 and the second control light B2 must be shorter than the spin population relaxation time. The time interval between the input light D and the write light W must be shorter than the optical phase relaxation time, but has a length sufficient to fall within the spectral width of the system.

Furthermore, the output light E satisfies a phase matching condition for the five or more optical pulses. The phase matching condition denotes a condition satisfying the following Equations (1) and (2), $$k_E + k_D = k_W + k_R \tag{1}$$

$$f_E = f_D = f_W + f_R \tag{2}$$

where $k_i$ is the propagation vector of an optical pulse i and $f_i$ is the frequency of the optical pulse i.

Figure 2:
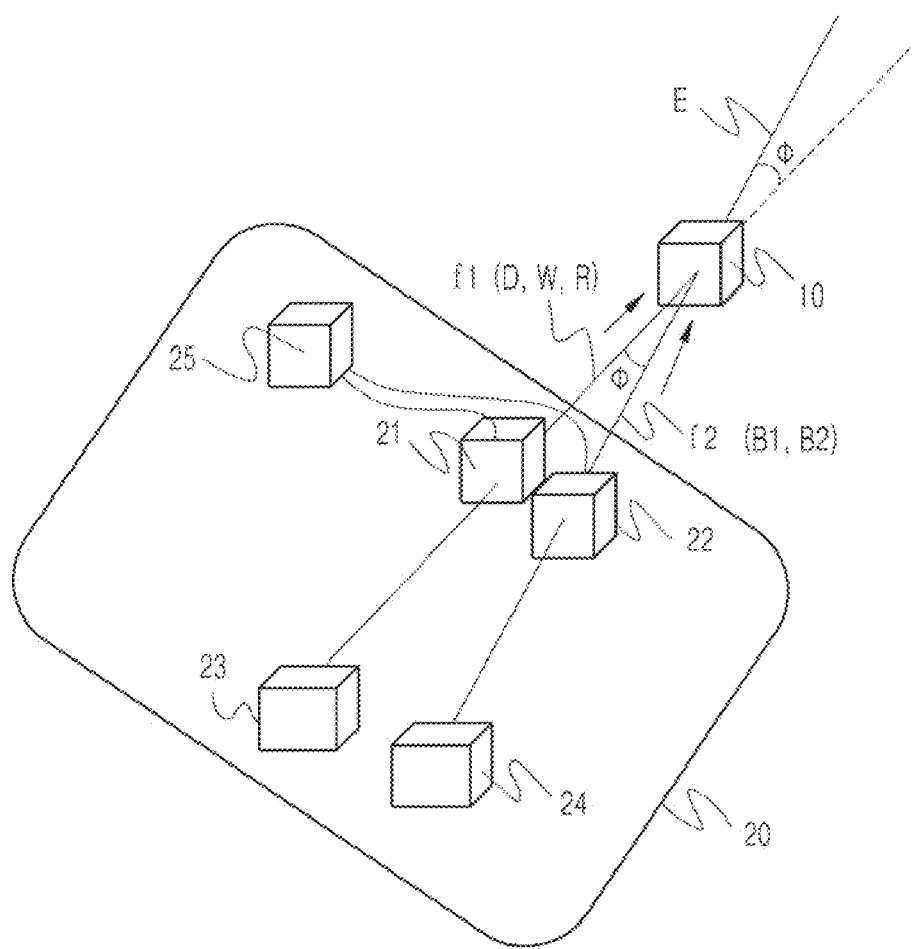
FIG. 2 is a diagram showing the optically locked photon echo apparatus according to an embodiment of the present invention.

FIG. 2 illustrates an optically locked photon echo apparatus according to an embodiment of the present invention.

As shown in FIG. 2, the optical pulse generation unit 20 of the optically locked photon echo apparatus includes a first light source 21 for outputting laser light; a second light source 22 for outputting laser light; a first optical modulation module 23 for modulating the laser light from the first light source 21 into an optical pulse train so as to generate some of the five or more optical pulses, a second optical modulation module 24 for modulating the laser light from the second light source 22 into an optical pulse train so as to generate the remaining optical pulses, which are different from the optical pulses generated by the first optical modulation module 23 among the five or more optical pulses; and a control module 25 for generating a synchronous signal required to synchronize the optical pulse trains output from the first and second optical modulation modules 23 and 24 with each other.

Figure 3:
FIG. 3 is a diagram showing the sequence of optical pulses for optically locked photon echoes according to the present invention.

FIG. 3 illustrates the sequence of optical pulses for optically locked photon echoes according to the present invention.

That is, the optical pulses are incident on the optical medium 10 in the sequence of the input light D, the write light W, the first control light B1, the second control light B2 and the read light R, and the output light E is generated last of all as a result. In FIG. 3, $T_i$ is the time at which an optical pulse i arrives at the optical medium.

Figure 4:
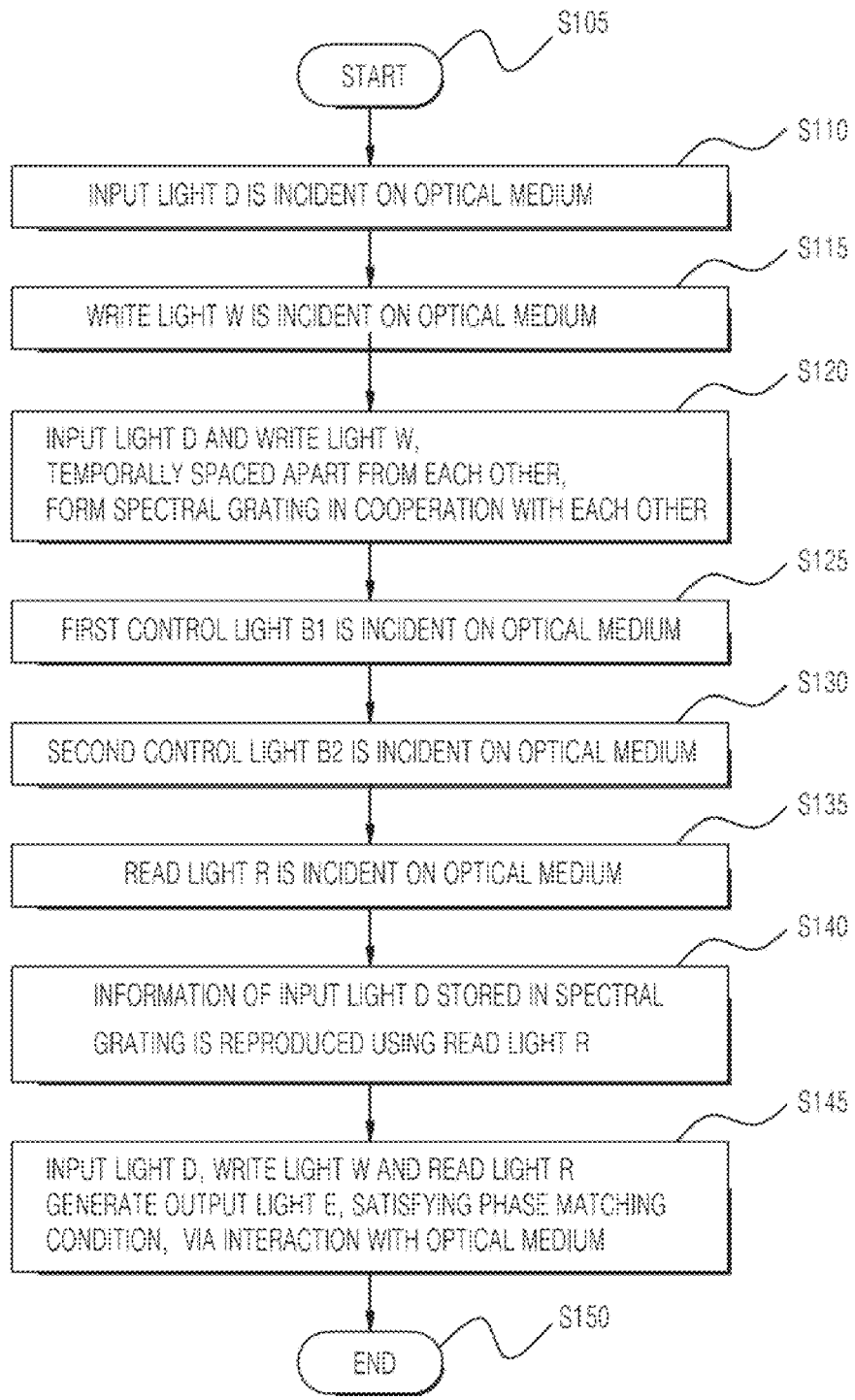
FIG. 4 is a flowchart showing an optically locked photon echo method according to the present invention.

FIG. 4 is a flowchart showing an optically locked photon echo method according to the present invention to describe FIG. 3 in detail.

As shown in FIG. 4, the optically locked photon echo method can be implemented according to the following sequence.

The optically locked photon echo method according to the present invention includes the step S110 of input light D being incident on the optical medium 10; the step S115 of the write light W being incident on the optical medium 10; the step S120 of the input light D and the write light W, which are temporally separated from each other, forming a spectral grating in cooperation with each other; the step S125 of the first control light B1 being incident on the optical medium 10; the step S130 of the second control light B2 being incident on the optical medium 10; the step S135 of the read light R being incident on the optical medium 10; the step S140 of reproducing the information of the input light D, stored in the spectral grating, using the read light R; and the step S145 of the input light D, the write light W and the read light R generating the output light E which satisfies the phase matching condition via interaction with the optical medium 10.

At step S120, the term "spectral grating" means that the information of the input light D is stored. However, it means that the information is stored in the wide frequency band of relevant atoms.

Further, at step S145, the output light E is determined by performing four-wave mixing generation.

FIGS. 5A to 5D illustrate the results of numerical simulations of conventional two-pulse photon echoes.

Figure 5A:
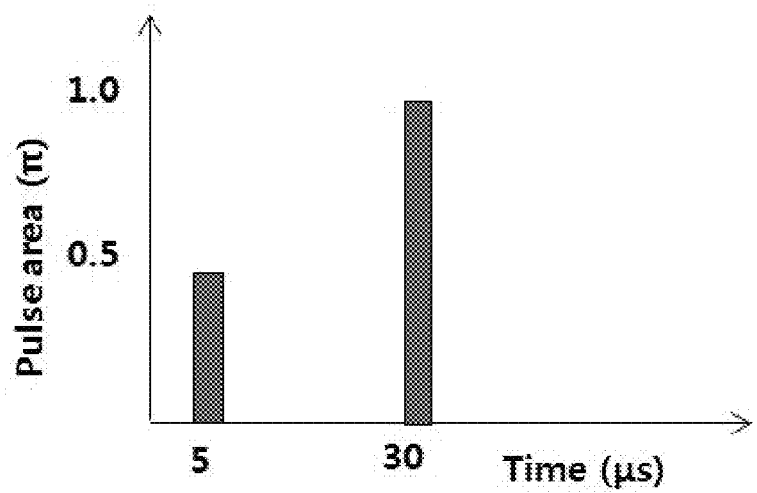
FIGS. 5A to 5D are diagrams showing the results of numerical simulations of typical two-pulse photon echoes.
Figure 5B:
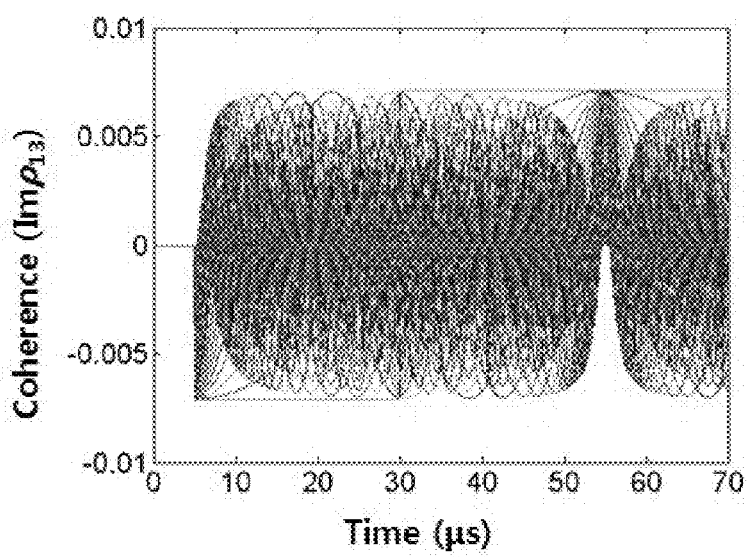

FIG. 5A illustrates the sequence of pulses corresponding to the input light D and the write light W resonating between the energy levels |1> and |3>. Unlike the optically locked photon echoes according to the present invention, the write light W needs perfect rephasing, so that the pulse width of W must be t. FIG. 5B illustrates the phase evolution of individual atoms over time, where coherence excited by the input light D is retrieved by the write light W at t=55 μs. This retrieved optical pulse is the photon echo.

Figure 5C:
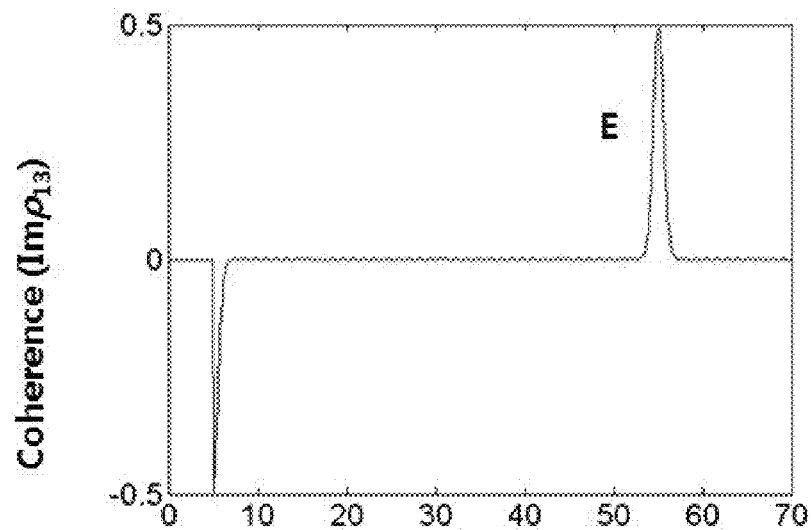
Figure 5D:
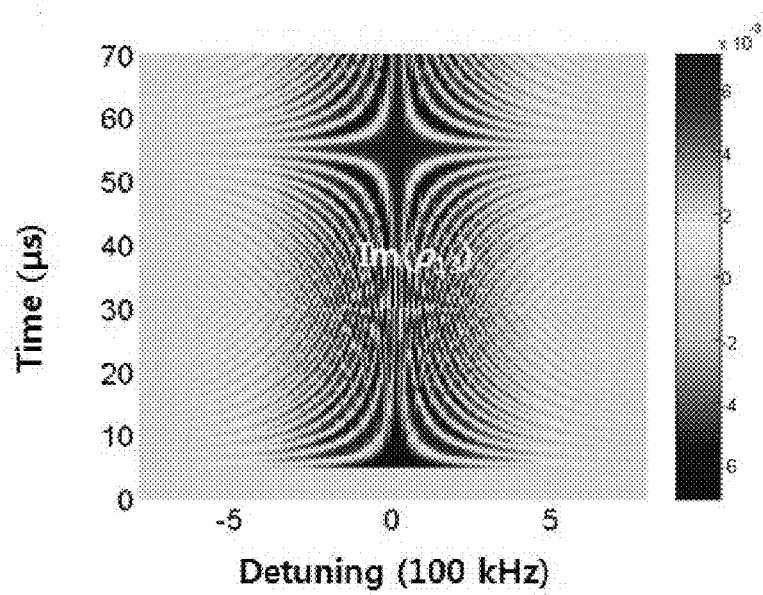
Figure 6A:
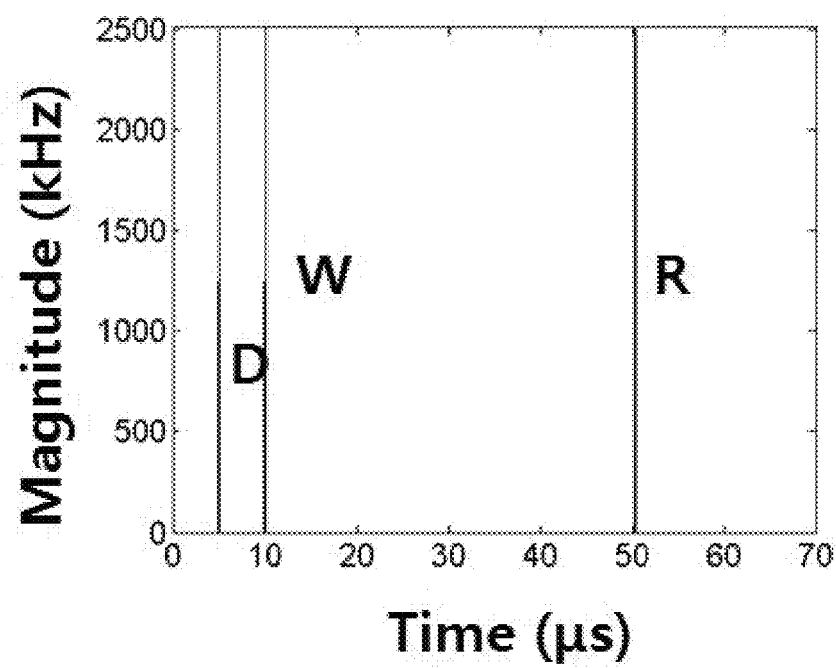
FIGS. 6A to 6D are diagrams showing the results of numerical simulations of three-pulse photon echoes.
Figure 6B:
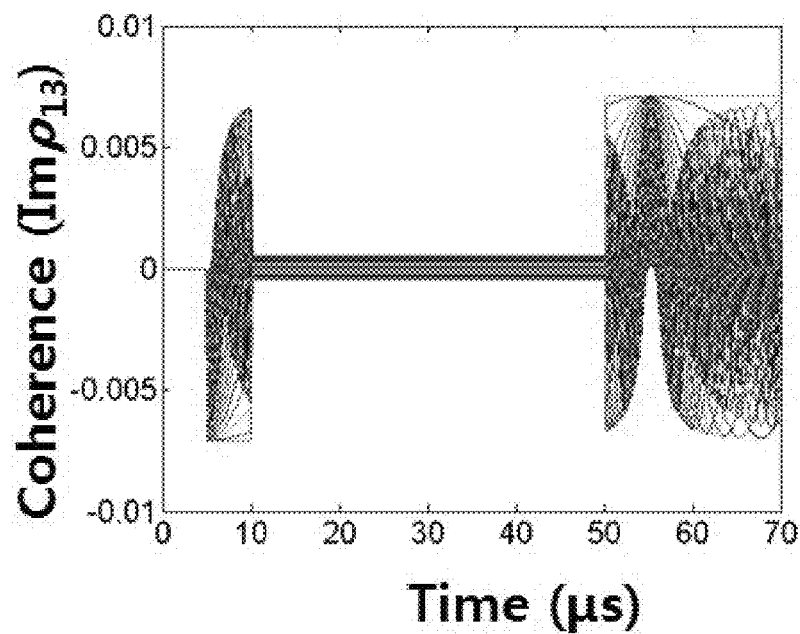
Figure 6C:
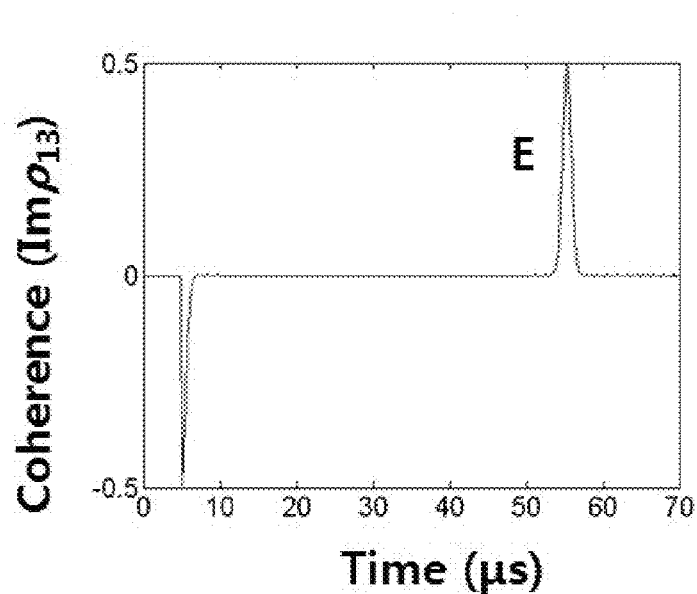
Figure 6D:
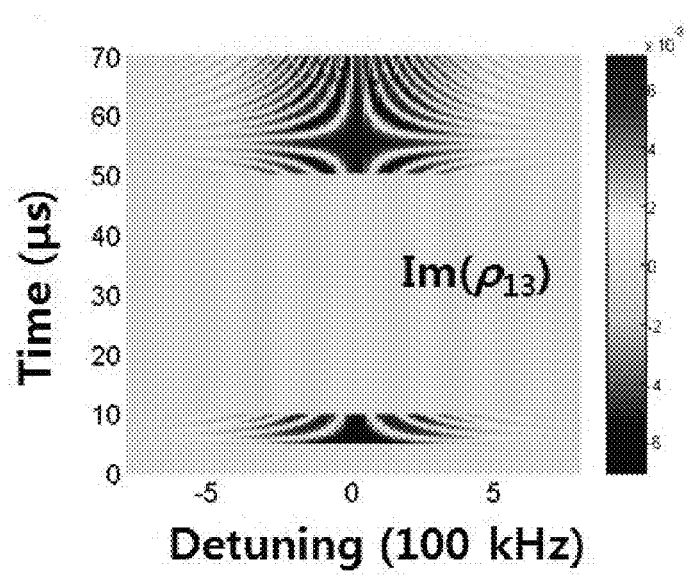

FIG. 5C illustrates the sum of phase coherences exhibited by the individual atoms of FIG. 5B. FIG. 5D illustrates the phase evolution of atoms detuned to resonant laser light over time. This detuning occurs because the optical medium is inhomogeneous, wherein detuned values are determined on the basis of inhomogeneous broadening of the atoms. In this case, conditions for the inhomogeneous broadening of atoms are the fundamental basis of photon echoes based on a rephasing process.

FIGS. 6A to 6D are diagrams showing the results of numerical simulations of conventional three-pulse photon echoes.

The write light W of FIGS. 5A to 5D is divided into two π/2 pulses, as shown in FIG. 6. This division is required in the three-pulse photon echoes to form a spectral grating according to the population inversion between the ground state and the excited state, rather than to perform rephasing which is the core principle of the two-pulse photon echoes. As described above, the information of the input light D is stored in the spectral grating. However, the final results are identical to those of FIGS. 5A to 5D except for the delay time.

In conclusion, the three-pulse photon echoes are intended to extend the storage time, which is due to the fact that the optical population decay time is longer than the phase relaxation time. However, unfortunately, due to this population decay, the initial coherence additionally decreases. When all decay has ultimately finished, coherence loss is more than 50%, and thus the three-pulse photon echoes cannot be applied to quantum memory.

FIGS. 7A to 7F are diagrams showing the comparison between the results of numerical simulations of three-pulse photon echoes and optically locked photon echoes.

Figure 7A:
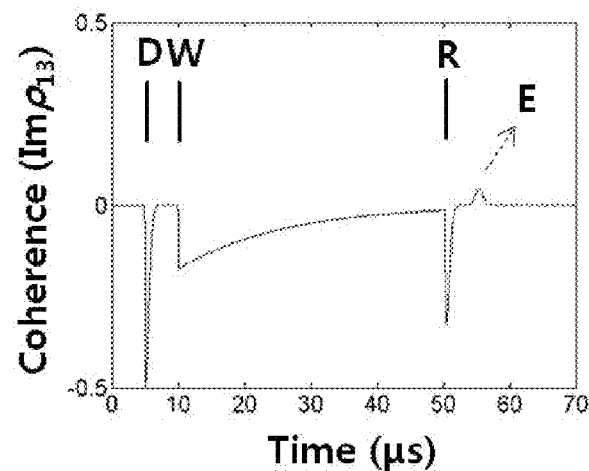
FIGS. 7A to 7F are diagrams showing the comparison between the results of numerical simulations of the three-pulse photon echoes and optically locked photon echoes.
Figure 7B:
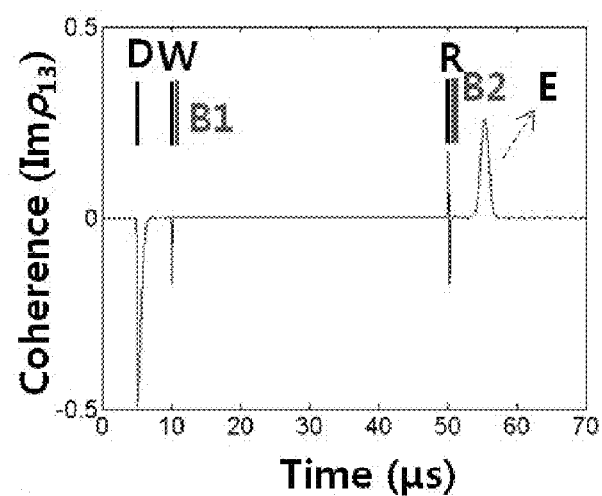
Figure 7C:
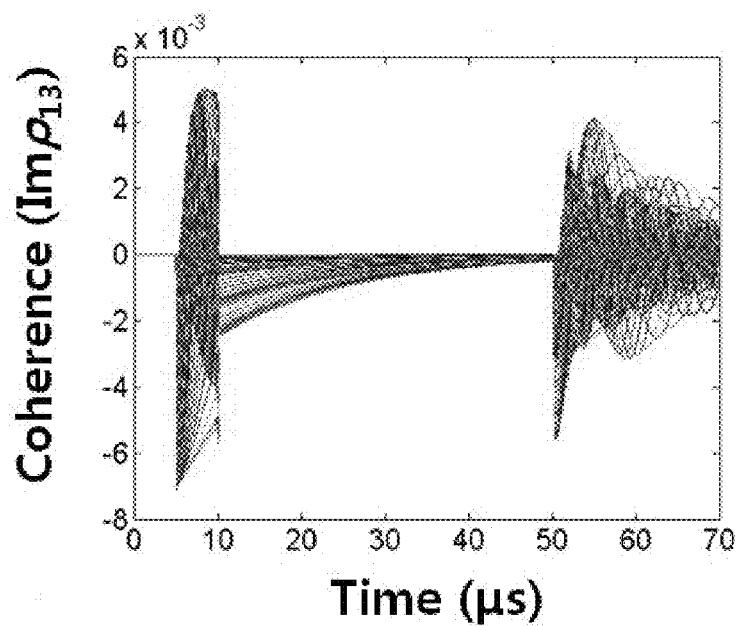
Figure 7D:
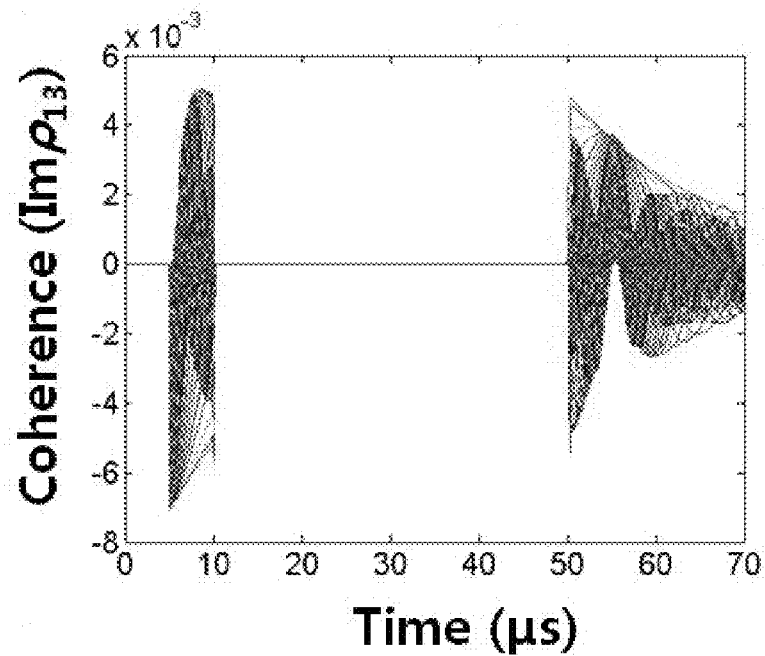
Figure 7E:
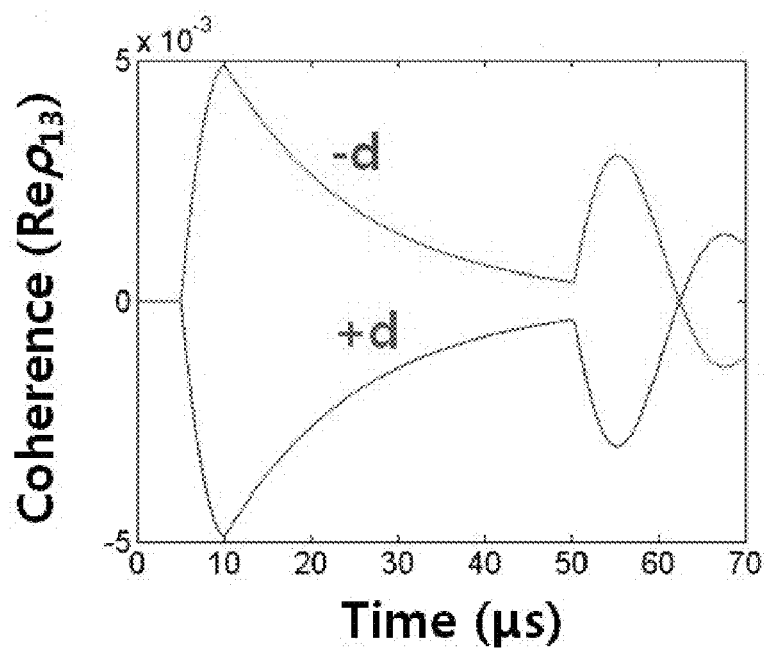
Figure 7F:
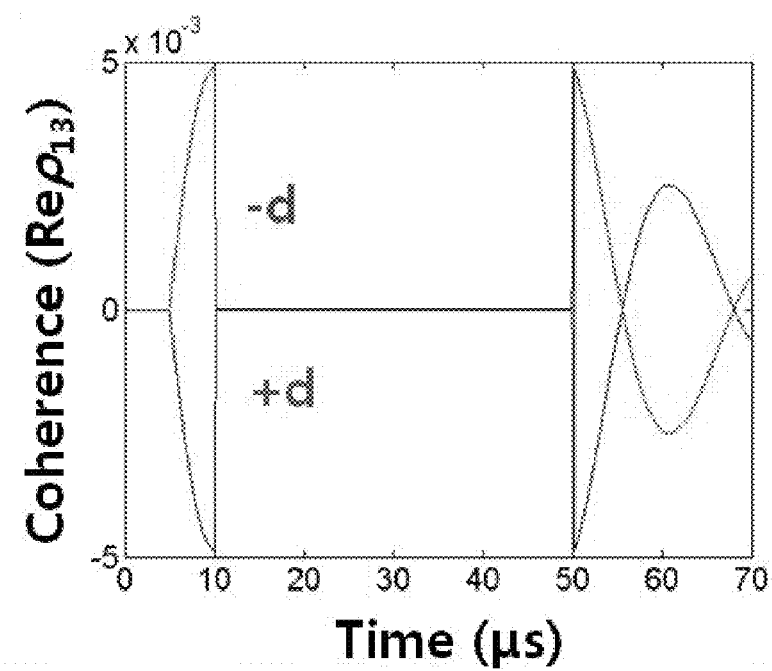

As described above with reference to FIGS. 1A and 1B, in FIG. 7B, an optically locked photon echo method can be implemented by adding the first control light B1 and the second control light B2. The magnitude of an echo in FIG. 7A is weakened according to the decaying parameter of the optical medium 10 of FIG. 1A. However, since a spin decaying parameter is more stable than an optical decaying parameter, it can be seen that the magnitude of the echo of FIG. 7B is much greater than that of FIG. 7A. FIGS. 7C and 7D illustrate individual atom evolutions for FIGS. 7A and 7B, respectively. FIGS. 7E and 7F illustrate the results of numerical simulations of the phase evolution of symmetrical atoms. FIG. 7E shows the reason why the magnitude of the echo of FIG. 7A is less than that of FIG. 7B, which is that in the case of the phase evolution of the individual atoms, the phase coherence is rapidly weakened and the relative coherence is also rapidly lost due to optical population loss.

FIGS. 8A to 8D illustrate the results of detailed numerical simulations for describing the optical locking of FIG. 7B.

Figure 8A:
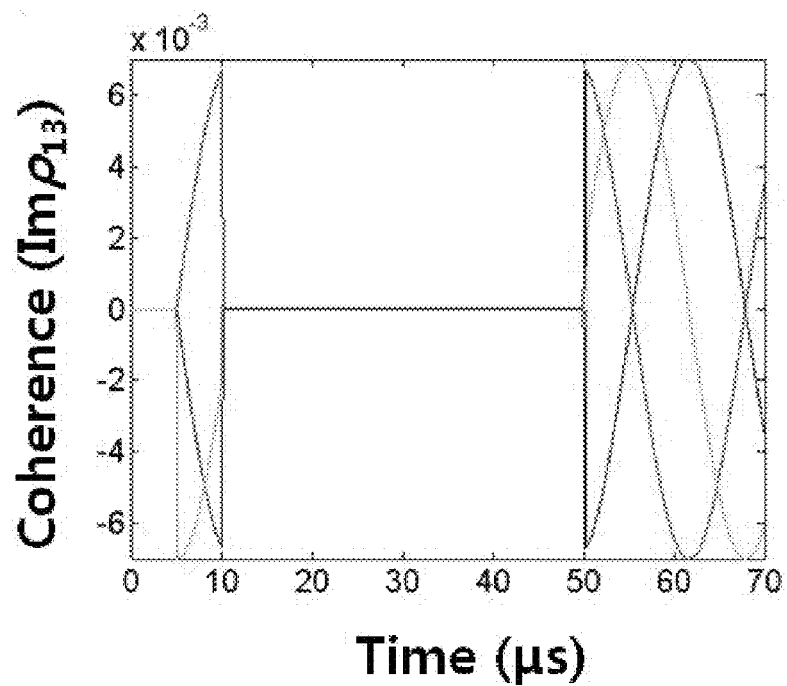
FIGS. 8A to 8D are diagrams showing the results of detailed numerical simulations for describing the optical locking of FIG. 7B.

FIG. 8A illustrates the results of numerical simulations of the phase evolution of symmetrical atoms which are identical to those of FIG. 7F.

Figure 8B:
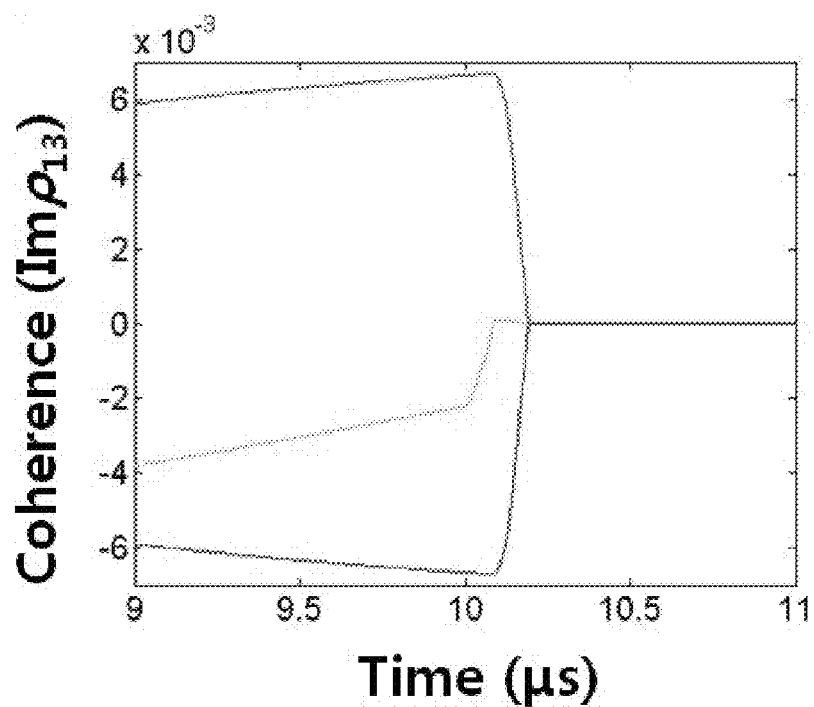

As shown in FIG. 8B, phase coherence Im$\rho_{13}$ (absorption) decreases to zero after the first control light B1 appears. The reason for this is that the transfer of the population from the energy level |3> to the energy level |2> occurs. Further, due to this population transfer, the phase evolution of all individual atoms is halted.

Figure 8C:
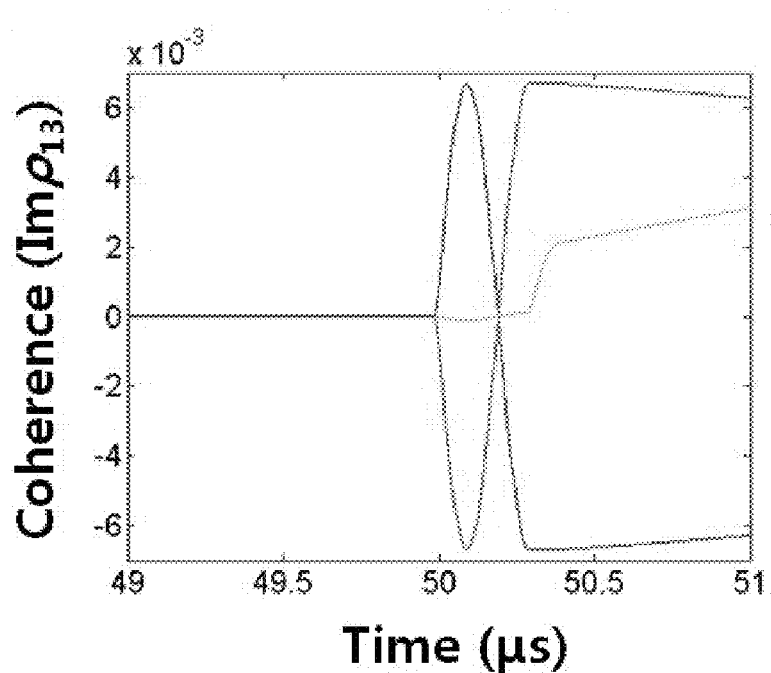

As shown in FIG. 8C, the phase evolution is halted until the second control light B2 is applied. Finally, the read light R reads the spectral grating, as in the case of the three-pulse photon echoes, and thus generates the echo output light E at t=50 μs.

In the optically locked photon echoes according to the present invention, two-photon coherence Re($\rho_{12}$) is created using the transfer of the population from the excited state |3> to the auxiliary ground state |2> only by the first control light B1. The two-photon coherence in such population transfer induction is more temporally stable than that of conventional phase-locked two-photon coherence.

Finally, optical coherence created by the input light D and the write light W is replaced with spin coherence by the first control light B1, and is then stored. Since the spin population relaxation time is much longer than the optical population decay time, it can be stored for a longer time. In contrast, the storage time is limited by the optical population decay time in the conventional three-pulse photon echo scheme.

In the present invention, this optical population decay time is replaced with spin population relaxation time, and thus the constraints on the storage time are overcome. The core principle of the present invention is that coherence in the excited state is replaced with the ground state using the first control light B1 in consideration of both the population and phase of the coherent atoms, and a resulting state is inversely replaced using the second control light B2.

Figure 8D:
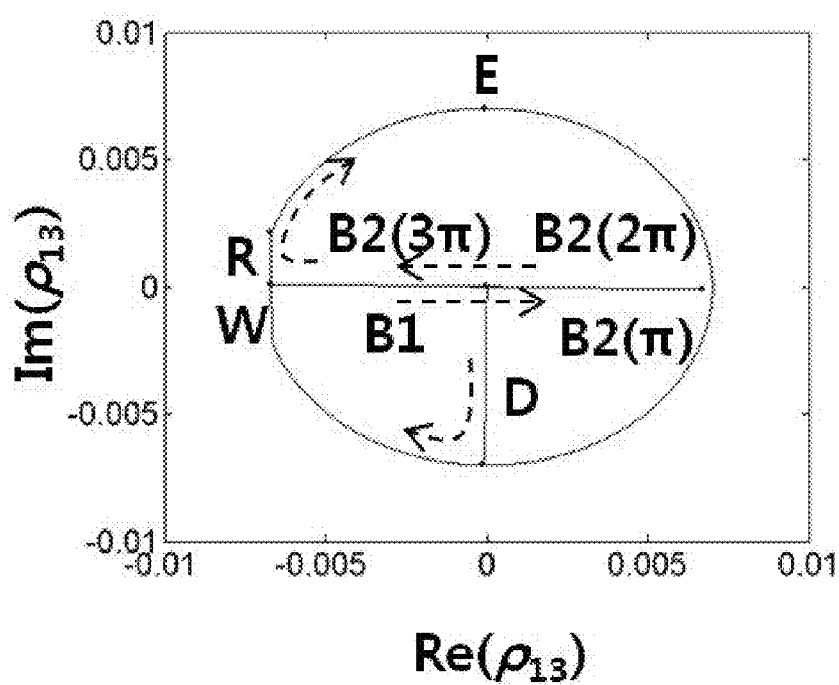

FIG. 8D illustrates a Bloch vector model in a uv plane, which shows that coherence evolution depending on the passage of time is halted after the first control light B1 appears. The important point in this case is that there is a need to correct a change in the phase of coherent atoms caused by a change in population occurring due to the first control light B1. For this operation, the area of the second control light B2 is different from that of the first control light B1 in such a way that the latter is $(2n-1)\pi$ (n is a natural number) and the former is $4n\pi$ (n is a natural number). Further, the sum of the first control light B1 and the second control light B2 must satisfy $4n\pi$ (n is a natural number), so that a $\pi$ pulse and a $3\pi$ pulse are respectively used as the first control light B1 and the second control light B2.

In more detail, a method of determining the areas of the pulses of the first and second control lights B1 and B2 will be described below.

Generally, in a rare-earth-doped medium, the spin population relaxation time is several million times as long as the optical population decay time. In this case, it is important that the original coherence levels of the atoms in optical coherence are damaged by optical population decay. In the spin state, since population decay is very slow, coherence loss actually stops. In order to read the optical information replaced and stored in this way, the atoms in the spin state must be converted back into those in the optical state. In this case, the second control light B2 is used. Here, it is important that a change in the population caused by the first control light B1 varies individual atoms' phase by $\pi/2$, and thus a change in the phase of at least $3\pi/2$ is additionally required to recover the phase to its original state. That is, the second control light B2 requires the area of a pulse which is three times as large as that of the pulse of the first control light B1. As a further explanation, $2\pi$ means that there is no change in phase.

Figure 9A:
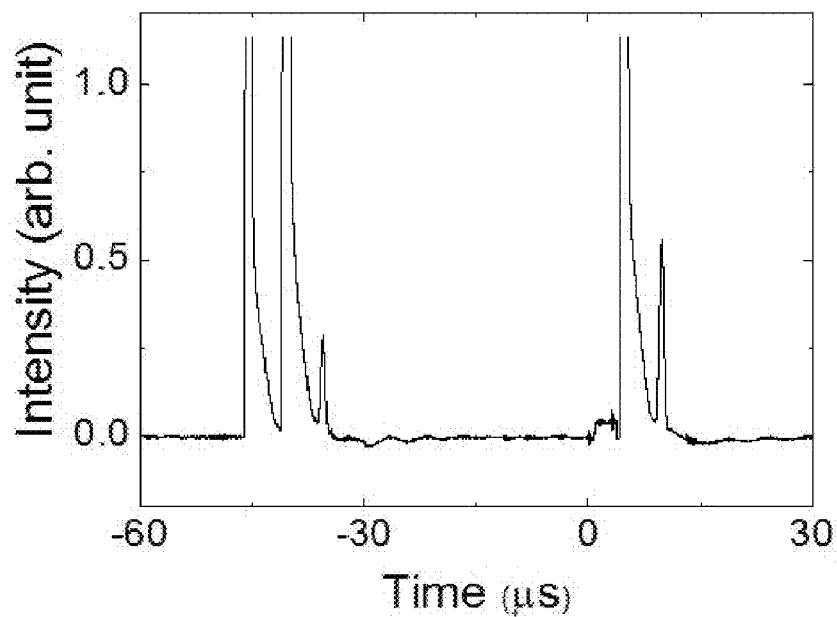
FIGS. 9A and 9B are diagrams showing the experimental results of the optically locked photon echoes according to the present invention.
Figure 9B:
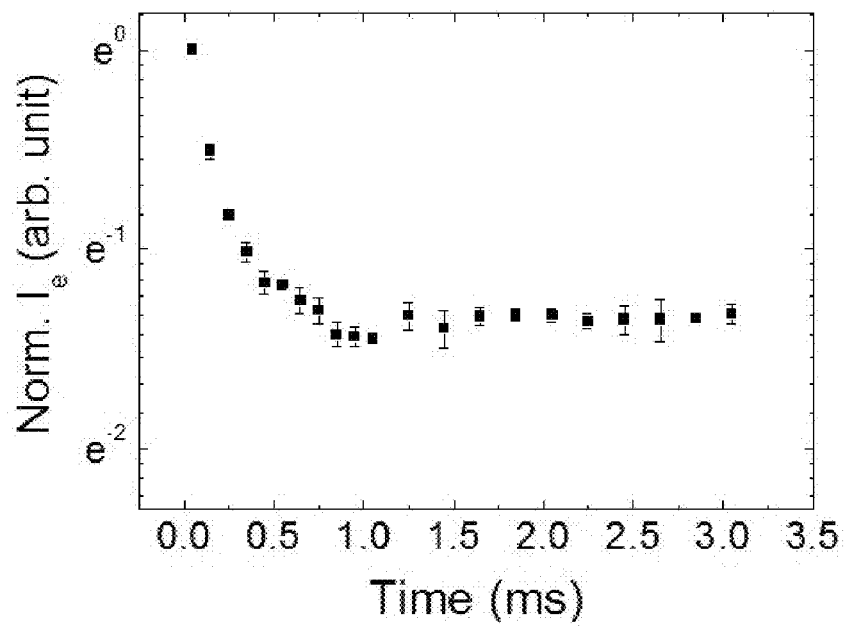

FIGS. 9A and 9B are diagrams illustrating the experimental results of the optically locked photon echoes according to the present invention.

As shown in FIG. 9A, the extension of the photon echo storage time was proven by adding the first control light B1 and the second control light B2. FIG. 9B illustrates the magnitude of a photon echo depending on the delay time of the second control light B2. The decay time was observed to be much longer than 500 μs which is the spin dephasing time. With regard to the spin dephasing time, a document by B. S. Ham et al., Opt. Lett. 22, 1849-1851 (1997) can be referred to. The experimental results of FIGS. 9A and 9B show that the core principle of the present invention has been sufficiently proven experimentally.

As described above, the present invention can provide an optically locked photon echo apparatus and method, which can solve the problem of limited echo efficiency and can overcome constraints on the conventional storage time being limited to the spin dephasing time.

Further, the present invention is advantageous in that it can halt the phase evolution of individual atoms as well as optical population decay, unlike the phase-locked photon echoes, thus extending the storage time up to the spin population relaxation time while obtaining more than 50% retrieval efficiency.

Furthermore, the present invention is advantageous in that the storage time can be unchanged even by spin dephasing caused by spin inhomogeneous broadening, thanks to the inherent optical phase locking characteristics of three-pulse photon echoes, unlike phase-locked photon echoes while preventing optical coherence loss from occurring during the storage time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optically locked photon echo apparatus, comprising:
a nonlinear optical medium provided with three energy levels |1>, |2>, and |3>, and configured to receive optical pulses from an optical pulse generation unit and generate output light (E) which satisfies a phase matching condition; and
the optical pulse generation unit configured to generate five or more optical pulses which resonate between the energy levels of the optical medium.

2. The optically locked photon echo apparatus according to claim 1, wherein the optical pulse generation unit comprises:
a first light source for providing first laser light;
a second light source for providing second laser light;
a first optical modulation module for modulating the first laser light from the first light source into an optical pulse train so as to generate some of the five or more optical pulses;
a second optical modulation module for modulating the second laser light from the second light source into an optical pulse train so as to generate remaining optical pulses, which are different from the optical pulses generated by the first optical modulation module among the five or more optical pulses; and
a control module for generating a synchronous signal required to synchronize the optical pulses output from the first and second optical modulation modules with each other.

3. The optically locked photon echo apparatus according to claim 1, wherein the five or more optical pulses fall into:
a first optical pulse group including one or more of optical pulses corresponding to input light (D), write light (W) and read light (R) which resonate between the energy levels |1> and |3> of the optical medium; and
a second optical pulse group including optical pulses corresponding to first control light (B1) and second control light (B2) which resonate between the energy levels |2> and |3> of the optical medium.

4. The optically locked photon echo apparatus according to claim 2, wherein the five or more optical pulses fall into:
a first optical pulse group including one or more of optical pulses corresponding to input light (D), write light (W) and read light (R) which resonate between the energy levels |1> and |3> of the optical medium; and
a second optical pulse group including optical pulses corresponding to first control light (B1) and second control light (B2) which resonate between the energy levels |2> and |3> of the optical medium.

5. The optically locked photon echo apparatus according to claim 3, wherein the first optical pulse group and the second optical pulse group have different wavelengths or polarization.

6. The optically locked photon echo apparatus according to claim 4, wherein the first optical pulse group and the second optical pulse group have different wavelengths or polarization.

7. The optically locked photon echo apparatus according to claim 3, wherein the five or more optical pulses are incident on the optical medium after having passed through an optical fiber, surface plasmon medium, or free space.

8. The optically locked photon echo apparatus according to claim 4, wherein the five or more optical pulses are incident on the optical medium after having passed through an optical fiber, surface plasmon medium, or free space.

9. The optically locked photon echo apparatus according to claim 3, wherein the three energy levels are set in such a way that the energy levels |1> and |2> are in a ground state, and the energy level |3> is in an excited state which enables optical transition from the individual ground states.

10. The optically locked photon echo apparatus according to claim 4, wherein the three energy levels are set in such a way that the energy levels |1> and |2> are in a ground state, and the energy level |3> is in an excited state which enables optical transition from the individual ground states.

11. The optically locked photon echo apparatus according to claim 9, wherein a time interval between the input light (D) and the write light (W) is shorter than an optical phase relaxation time, but has a length to fall within the inhomogeneous width.

12. The optically locked photon echo apparatus according to claim 10, wherein a time interval between the input light (D) and the write light (W) is shorter than an optical phase relaxation time, but has a length to fall within the inhomogeneous width.

13. The optically locked photon echo apparatus according to claim 9, wherein a time interval between the first control light (B1) and the second control light (B2) is shorter than a spin population relaxation time.

14. The optically locked photon echo apparatus according to claim 10, wherein a time interval between the first control light (B1) and the second control light (B2) is shorter than a spin population relaxation time.

15. The optically locked photon echo apparatus according to claim 9, wherein areas of the pulses corresponding to the first control light (B1) and the second control light (B2) are $\pi$ and $3\pi$, respectively, and a sum of the areas of the pulses is $4\pi$.

16. The optically locked photon echo apparatus according to claim 10, wherein areas of the pulses corresponding to the first control light (B1) and the second control light (B2) are $\pi$ and $3\pi$, respectively, and a sum of the areas of the pulses is $4\pi$.

17. The optically locked photon echo apparatus according to claim 1, wherein the nonlinear optical medium is made of any one selected from among a solid, multiply coupled semiconductors and a cold atom ensemble.

18. An optically locked photon echo method for generating output light (E), which satisfies a phase matching condition, using an optically locked photon echo apparatus, the apparatus including a nonlinear optical medium provided with three energy levels |1>, |2> and |3> and configured to receive optical pulses from an optical pulse generation unit and generate the output light (E); and the optical pulse generation unit configured to generate optical pulses corresponding to one or more input lights (D), write light (W), read light (R), first control light (B1) and second control light (B2) which resonate between the energy levels of the optical medium, the method comprising:
the input light (D) being incident on the optical medium;
the write light (W) being incident on the optical medium;
the input light (D) and the write light (W), which are temporally separated from each other, forming a spectral grating in cooperation with each other;
the first control light (B1) being incident on the optical medium;
the second control light (B2) being incident on the optical medium;
the read light (R) being incident on the optical medium;
reproducing information of the input light (D), stored in the spectral grating, using the read light (R); and
the input light (D), the write light (W) and the read light (R) generating the output light (E), which satisfies the phase matching condition, via interaction with the optical medium.

* * * * *